US010860162B2

(12) United States Patent
Mikkelsen (10) Patent No.: US 10,860,162 B2
(45) Date of Patent: Dec. 8, 2020

(54) SUPERVISORY CONTROL SYSTEM FOR CONTROLLING A TECHNICAL SYSTEM, A METHOD AND COMPUTER PROGRAM PRODUCTS (75) Inventor: Christine Mikkelsen, Västerås (SE)

(73) Assignee: ABB Schweiz AG, Baden (CH)

( * ) Notice: Subject to any disclaimer, the term of this patent is extended or adjusted under 35 U.S.C. 154(b) by 859 days.

(21) Appl. No.: 13/264,684

(22) PCT Filed: Jul. 8, 2009

(86) PCT No.: PCT/EP2009/058671
§ 371 (c)(1),
(2), (4) Date: Oct. 14, 2011

(87) PCT Pub. No.: WO2010/118785
PCT Pub. Date: Oct. 21, 2010

(65) Prior Publication Data
US 2012/0036465 A1 Feb. 9, 2012

Related U.S. Application Data (60) Provisional application No. 61/170,206, filed on Apr. 17, 2009.

(51) Int. Cl.
G06F 3/0481 (2013.01)
G06F 3/0486 (2013.01)
G06F 3/0488 (2013.01)
G06F 3/0482 (2013.01)
G06F 3/14 (2006.01)

(52) U.S. Cl.
CPC .......... *G06F 3/0481* (2013.01); *G06F 3/0482* (2013.01); *G06F 3/0486* (2013.01); *G06F 3/04886* (2013.01); *G06F 3/1423* (2013.01)

(58) Field of Classification Search
CPC .............. G06F 3/04817; G06F 3/0482; G06F 3/04886; G09G 2320/08
USPC .................................................. 715/771, 778
See application file for complete search history.

(56) References Cited

U.S. PATENT DOCUMENTS

| 6,628,309 | B1 | 9/2003 | Dodson et al. |
| 6,737,966 | B1 | 5/2004 | Calder |
| 7,552,399 | B2 * | 6/2009 | Muller ................ G06F 3/04817 715/810 |
| 7,752,566 | B1 * | 7/2010 | Nelson .................. G06F 3/0412 715/768 |
| 2002/0116539 | A1 * | 8/2002 | Bryczkowski et al. ...... 709/317 |
| 2003/0189597 | A1 | 10/2003 | Anderson et al. |
| 2004/0036662 | A1 | 2/2004 | Sakumura |
| 2004/0222942 | A1 | 11/2004 | Hayashi et al. |
| 2006/0048062 | A1 * | 3/2006 | Adamson ............... G09G 5/363 715/760 |

(Continued)

FOREIGN PATENT DOCUMENTS

EA 1408398 A2 4/2004

*Primary Examiner* — Christopher J Fibbi
(74) *Attorney, Agent, or Firm* — Slater Matsil, LLP (57) ABSTRACT A control system and methods for controlling a technical system includes one or more display units constituting a display working environment. The control system further includes an arrangement thumbnail, in turn including graphical representation of the display working environment, the arrangement thumbnail being provided on one of the display units.

18 Claims, 5 Drawing Sheets (56) References Cited

U.S. PATENT DOCUMENTS

| | | | |
|---|---|---|---|
| 2006/0242584 A1* | 10/2006 | Johanson | H04N 7/15 |
| | | | 715/738 |
| 2007/0283285 A1* | 12/2007 | Buchmann | 715/764 |
| 2008/0048975 A1 | 2/2008 | Leibow | |
| 2008/0104535 A1 | 5/2008 | Deline et al. | |
| 2009/0276701 A1* | 11/2009 | Nurmi | G06F 3/0238 |
| | | | 715/702 |
| 2009/0300541 A1* | 12/2009 | Nelson | G06F 3/0481 |
| | | | 715/799 |
| 2010/0138768 A1* | 6/2010 | Lonkar et al. | 715/769 |
| 2010/0257471 A1* | 10/2010 | Ang | G06F 3/04817 |
| | | | 715/769 |

* cited by examiner

Fig. 9 ized to receive and is received by a Supervisory control system. The
SUPERVISORY CONTROL SYSTEM FOR CONTROLLING A TECHNICAL SYSTEM, A METHOD AND COMPUTER PROGRAM PRODUCTS

CROSS REFERENCE TO RELATED APPLICATIONS

This application is the National Phase of PCT/EP2009/058671 filed on Jul. 8, 2009, which claims priority under 35 U.S.C. 119(e) to U.S. Provisional Application No. 61/170,206 filed on Apr. 17, 2009, all of which are hereby expressly incorporated by reference into the present application.

FIELD OF THE INVENTION

The invention relates generally to the field of supervisory control systems and in particular to graphical user interfaces in such supervisory control systems.

BACKGROUND OF THE INVENTION

Automated systems and their supervision and control is very important within different kinds of commercial applications, such as industrial production, where automated systems have enabled the elimination of monotonous tasks and minimize hazardous elements in a production line, or such as power generation and transmission, where the automated systems are the power generation plants and/or the power transmission and distribution network or networks with their corresponding substations. Today, most industrial processes such as the above mentioned generating and transmitting of energy, but also food processing, pharmaceutical and chemical production or manufacturing of consumer products are indeed more or less automated, i.e. have automatic, computerised supervision, control, operation and management.

The automated systems comprise several operational control units, i.e. control units which control operational elements of the automated system and which receive system relevant and therefore higher-level control inputs from a supervisory control system. The supervisory control system in general provides the possibility of an interaction between a user or operator and the different control units. In industrial practice, such supervisory control systems are known under the term SCADA (Supervisory Control And Data Acquisition).

As is readily understood, the corresponding supervisory control systems receive a vast amount of information taken by measuring units from the different operational elements of the automated system. This vast amount of information requires the attention of the user or operator. The information therefore has to be organized as efficiently as possible. It is realized that this need for organizing information is important in many other applications as well, besides automated systems.

From US 2008/0104535 it is known to create graphical thumbnails for facilitating document navigation. A scrollbar thumbnail provides the user with scaled representations of documents, allowing the user to identify points of interest within that document.

From EP 1 408 398 a system for managing software applications in a graphical user interface is known. Multiple software applications can be grouped by means of control tiles.

From US 2003/0189597 a method for presenting several virtual desktops is known. A user may preview a number of scaled virtual desktops in order to facilitate finding an active application window of interest.

SUMMARY OF THE INVENTION

In the operator environment wherein processes and operational elements within e.g. a power transmission network are supervised and which deliver the above-mentioned vast amount of information to the supervisory control system, it is common to use a multi-display setup and/or very large display units. Sometimes up to ten or even more display units are used by a single operator. One problem that arises when the user interface is displayed over several display units or on a large display unit is that the arrangement of information may be cumbersome and inefficient. The user often has to drag information, such as pictures, from one display to another or from one side to another. These drag-and-drop actions take time and require movements that are harmful for the operator from an ergonomic point of view.

Other ways of arranging the information, besides drag-and-drop methods, may also require non-ergonomic movements. For example, if the operator arranges the information by means of several clicking operations with e.g. a computer mouse, the corresponding movements would have to be done.

The operator thus needs an efficient way to arrange the information on the display units. Although the earlier mentioned prior art describes ways to facilitate the handling of documents and/or software programs, there is still need for improvements, for example in regards of the ergonomic aspects.

In view of the above, it is an object of the present invention to provide means and methods for improving the working conditions for an operator, in particular an operator working in an environment having multiple display units and/or a large display unit.

It is another object of the invention to provide means and methods for improving the arranging of information required in a supervisory control system.

These objects, among others, are achieved by a supervisory control system, by a method and by computer program products as claimed in the independent claims.

In accordance with the invention, a supervisory control system for controlling an automated system is provided. The supervisory control system comprises one or more display units, which constitute a display working environment. The supervisory control system further comprises an arrangement thumbnail, which in turn comprises a graphical representation of the display working environment. The arrangement thumbnail is provided on one of the display units. By having an arrangement thumbnail showing in graphical representations the display working environment, an improved way of arranging of the information that is available within the supervisory control system is provided. All display units are shown in an easy to grasp overview and the operator is able to quickly arrange relevant information in any desired way.

In one embodiment of the invention, one or more display units comprise means for visualizing information objects related to the controlling of the technical system. The supervisory control system further comprises means for managing such information objects by operations performed within the arrangement thumbnail.

In another embodiment of the invention, the graphical representation comprises thumbnail images of the one or more display units. The working environment is thereby visualized in an easily comprehensible image and accurate placement of the information objects at desired locations is thus enabled.

In another aspect of the invention, a method for arranging objects used in a supervisory control system is provided. The supervisory control system comprises comprising one or more display units constituting a display working environment. The method comprises the steps of: providing, on one of the display units, an arrangement thumbnail comprising a graphical representation of the display working environment; receiving a user input related to a desired location of the objects on one of the display units, wherein the user input comprises operations performed within the arrangement thumbnail; and arranging, in response to receiving the user input, the objects. By having an arrangement thumbnail showing in graphical representations the display working environment, an improved way of organizing the information is provided. As an easy to grasp overview of all display units is provided, the operator is able to easily determine which information should be placed on which screen, or on which part of screen if a single display unit is used. Further, the operator is relieved from performing non-ergonomic movements. He or she is able to arrange the information by looking only at the arrangement thumbnail, and by performing small and ergonomically favourable movements within the arrangement thumbnail.

In accordance with an embodiment of this aspect of the invention, the operations performed within the arrangement thumbnail comprises selecting a particular display unit and/or a specific part of the display unit.

In accordance with another embodiment of the invention, the step of providing, on one of the display units an arrangement thumbnail comprises showing the arrangement thumbnail upon receiving an information arranging signal.

In accordance with another embodiment of the invention, the information arranging signal may be received when a user selects the object from a list, or when a user performs a drag operation of the object. These are well-known operations, that most operators are familiar with, but wherein the movements required by the operator are made considerably smaller by means of the provision of the arrangement thumbnail. The invention is thus flexible in that it may be implemented in different manners, adaptable to the particular application at hand.

In accordance with an embodiment of this aspect of the invention, the method comprises the further steps of providing a feedback signal visualizing where on the display units the objects will be placed, wherein the feedback signal is based on the user input signal; and the step of outputting the feedback signal on one of the display units. By means of this feature, the user gets a visible feedback on where the information will be placed if he chooses this particular location. He may thus easily see whether it is indeed a suitable location.

Further features and advantages thereof will become clear upon reading the detailed description and the accompanying drawings.

DETAILED DESCRIPTION OF EMBODIMENTS

From the introductory part it is clear that the user, or operator, supervising and managing automated systems or other technical systems needs an efficient way to arrange the vast amount of information involved. The arrangement of the information should be enabled without the user having to perform time-consuming and possibly non-ergonomic operations, such as for example when dragging and dropping the information over the whole display area.

Briefly, in accordance with the invention, a small representation of the display setup, an arrangement thumbnail, is provided when the user wishes to move information to a new position or when the user needs to place new information on the display setup. The user can then arrange the information for example by drag and drop operations of the information. That is, the information, e.g. pictures, text, objects, application windows etc., may be dragged and dropped to the arrangement thumbnail in order to arrange the information in a suitable manner. When the information is dropped over the representation it automatically appears at the corresponding area of the physical display unit. The arrangement thumbnail may appear and be shown on a display next to a computer mouse cursor, and it is preferably shown on the display unit from which the information is to be moved. The arrangement thumbnail thus preferably appears on the display unit that the operator is presently working within.

An alternative way of arranging the information comprises to use a so called context menu which for example pops up when the user clicks on the information to be moved, with e.g. a particular computer mouse button. In the context menu, an item "move" can be chosen. After clicking on the "move" item, it will be indicated visually that the next "entering" action performed with the computer mouse inside the arrangement thumbnail, is interpreted in a way that the information is to be moved to the position of a cursor inside the arrangement thumbnail when the "entering" action is performed. The location of the cursor corresponds in conventional manner to the movements of the computer mouse. The result is thus the same as with the drag-and-drop operation described above and further below. Yet additional ways for moving information from one place to another are conceivable and within the scope of the invention. However, in order to simplify the description, the information movement operations will in the following be exemplified by the drag and drop operations.

Figure 1:
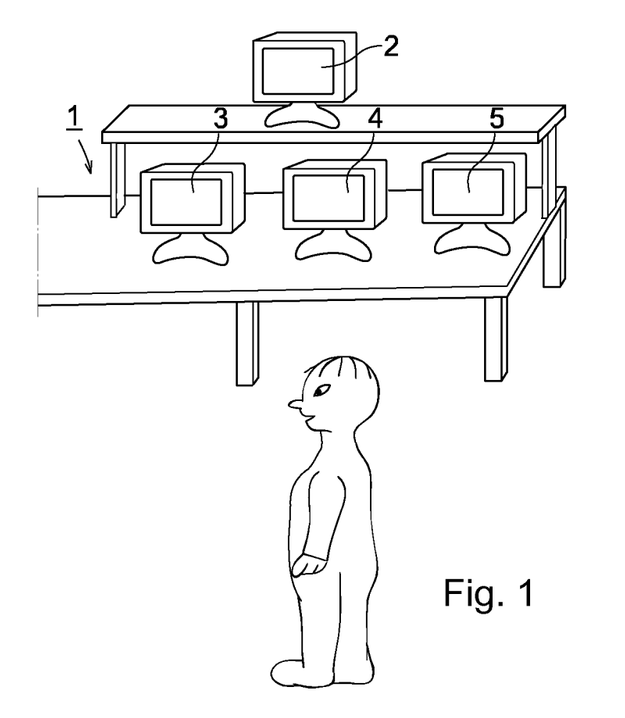
FIG. 1 illustrates a working environment wherein the invention may be implemented.

FIG. 1 illustrates an operator environment comprising several display units 2, 3, 4, 5 and in which an embodiment of the invention may be implemented. As mentioned, the operator of many kinds of supervisory control systems often uses several display units 2, 3, 4, 5 for displaying the information involved in the supervision of the technical system. These display units 2, 3, 4, 5 constitute a display working environment 1 for the operator.

Figure 2:
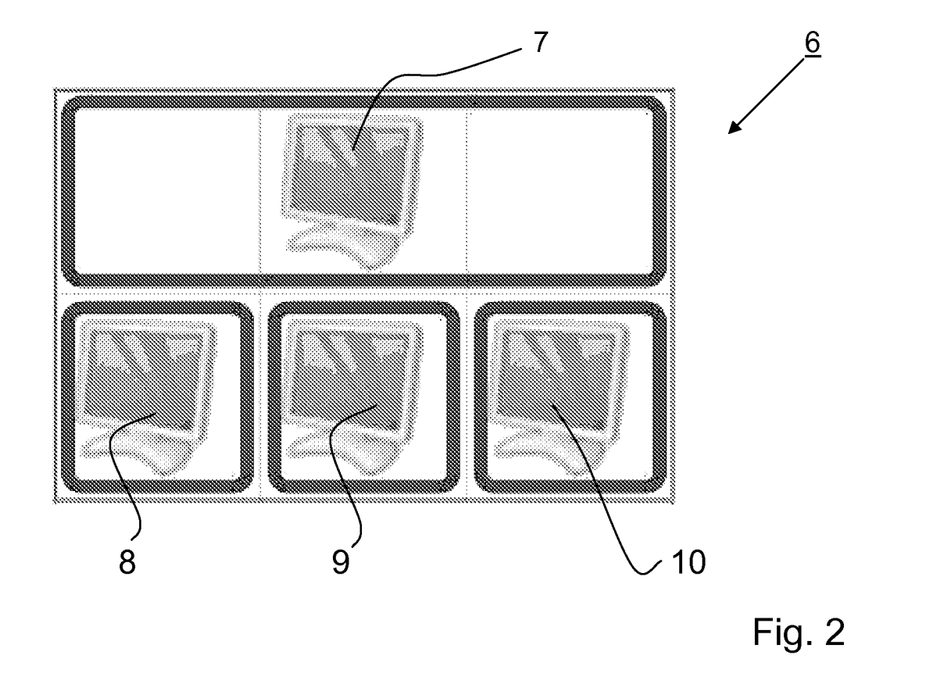
FIG. 2 illustrates an embodiment of the invention in an environment comprising several display units.

FIG. 2 illustrates an embodiment of the invention. In accordance with the invention, an arrangement thumbnail 6 is provided. The arrangement thumbnail 6 comprises thumbnail display unit images 7, 8, 9, 10 of each physical display unit 2, 3, 4, 5 used in the display working environment 1. That is, the arrangement thumbnail 6 is created based on the actual physical display unit 2, 3, 4, 5 of the display working environment 1. As is well known within the technical field of computers, a thumbnail is a reduced-size version of a picture. The thumbnails may be produced in any suitable manner, for example by simply reducing the dimensions of a large picture.

When the user wants to move information or when he or she wants to arrange new information, the operation starts when the user selects, in some way, the information. For example, when the user wants to move information that is visible on one physical display unit, e.g. display unit 2, to another physical display unit, e.g. display unit 5, he may e.g. click on the frame of the information if such frame is available. The arrangement thumbnail 6 will then automatically be shown. The operator is thereafter able to quickly choose the new location of the information by choosing a desired one of the thumbnail display units. The choice of new display unit may be done for example by clicking on the corresponding thumbnail display unit. These operations can be done using only small physical movements, which is very beneficial from an ergonomic point of view.

Another example on how to arrange information available within the supervisory control system comprises to select information from a list, information that is not yet shown on any of the display units. The operator may for example choose a particular substation in a list that lists all substations within a power network. By choosing a particular substation for example "Troy", e.g. by dragging the text "Troy" of the lists, the arrangement thumbnail 6 will appear. The operator may then, as above, choose on which display unit to place the information, which may for example comprise an illustration over substation "Troy".

Figure 3:
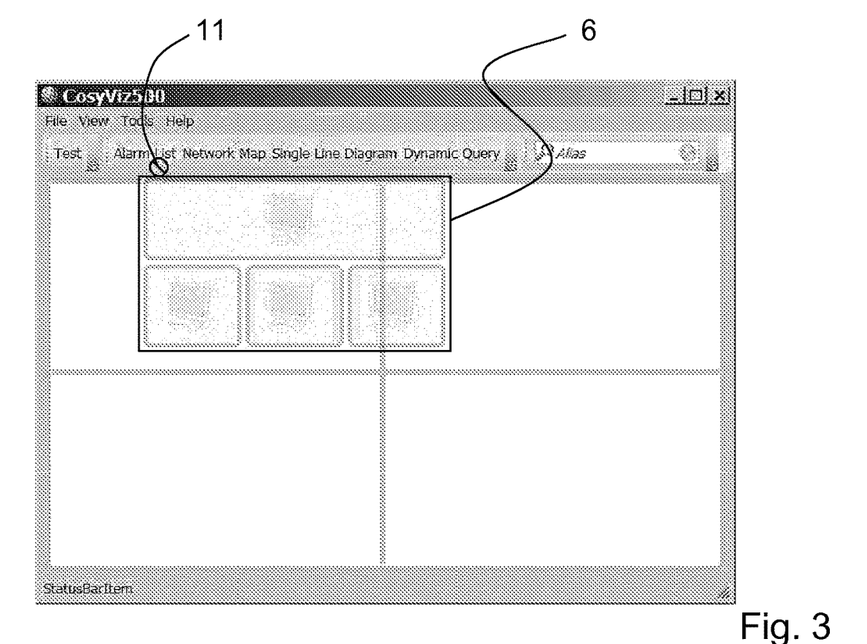
FIGS. 3-5 illustrate screen shots of an embodiment of a method in accordance with the invention.

FIG. 3 illustrates a piece of information 11, in this example an alarm list, which the user wants to show on display unit 2. In an embodiment, the arrangement thumbnail 6 appears as soon as the user starts the information moving operation. The arrangement thumbnail 6 may for example be visible in an opaque or transparent manner.

Figure 4:
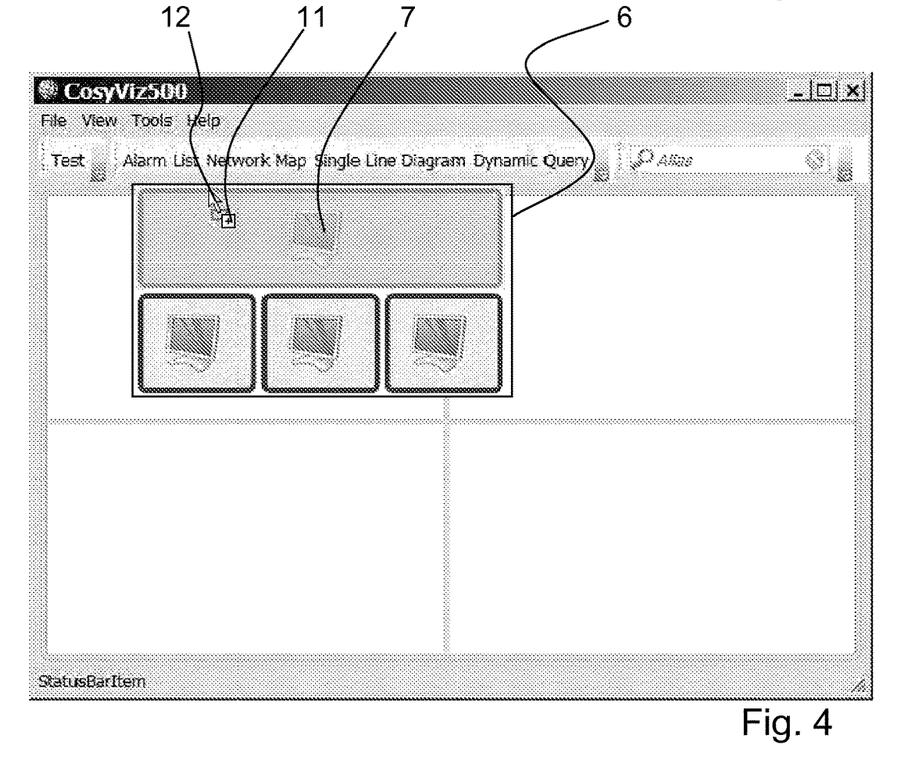

Thereafter, and with reference to FIG. 4, the user chooses to which physical display unit the information 11 is to be moved, in this exemplary case physical display unit 2. The user moves the representation of the information 11 over the chosen display unit within the arrangement thumbnail 6, i.e. over thumbnail display unit image 7 which corresponds to the physical display unit 2.

Figure 5:
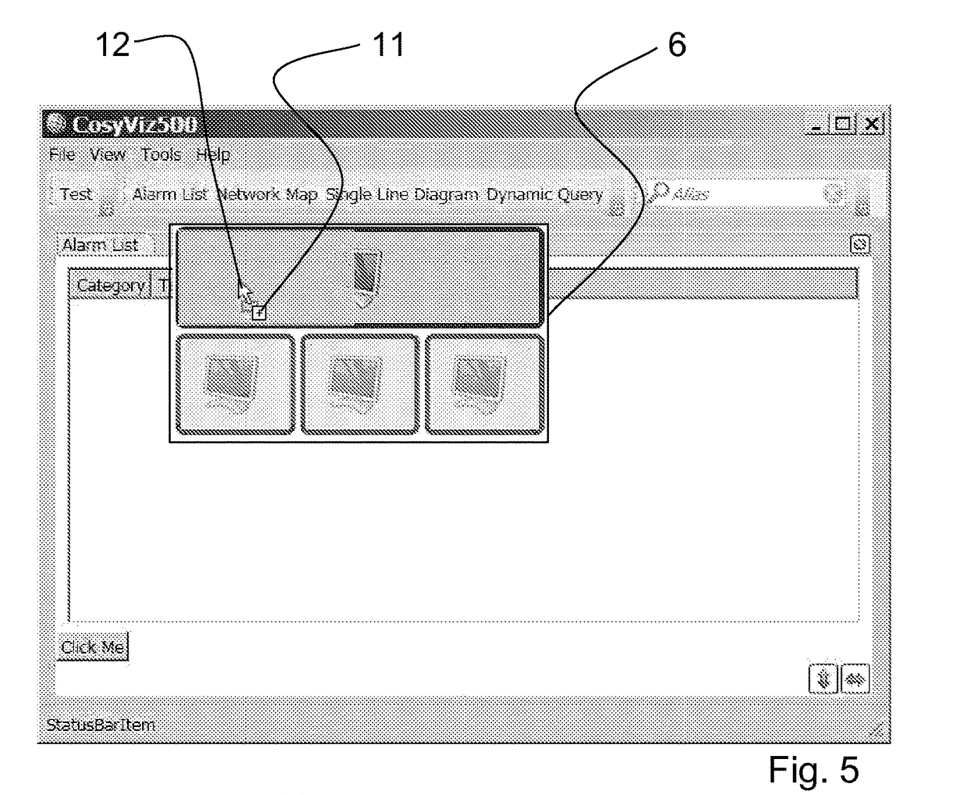

The user then chooses where on the physical display unit 2 he wants to place the information, as is illustrated in FIG. 5. The placement on the physical display unit is dependent on whereto, on the thumbnail display unit image in the arrangement thumbnail 6, the information is moved.

Figure 6:
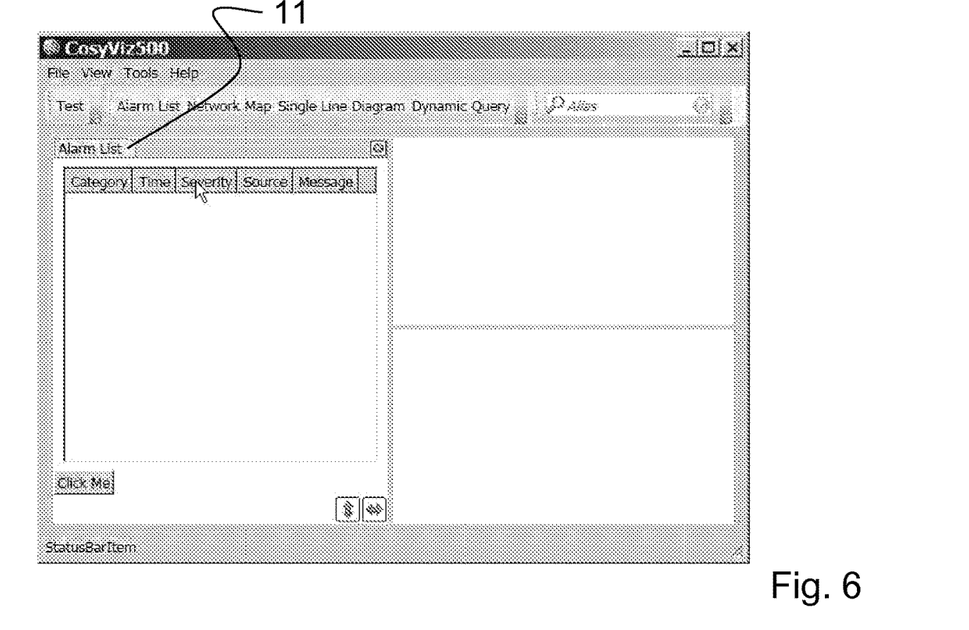
FIG. 6 illustrates the result of the operations illustrated in FIG. 5.

The user preferably gets feedback on where the information will be placed if he drops it and when he is satisfied with the placement the interaction ends when he drops it at the desired place. The information 11 is then shown on the physical display unit 2, and in particular on the left hand side of the display unit 2 in accordance with the selection. This is illustrated in FIG. 6. The feedback on where the information is placed may for example be in the form of using a different shade for the suggested placement compared to the surrounding environment. That is, as the user moves the information 11, the movement is visible as a cursor 12 and as the cursor 12 is moved, the information drop-off place changes shade. The drop-off place can be defined with suitable precision, the possible drop-off places may for example be defined as halves of the physical display unit, or as quadrants thereof etc.

Figure 7:
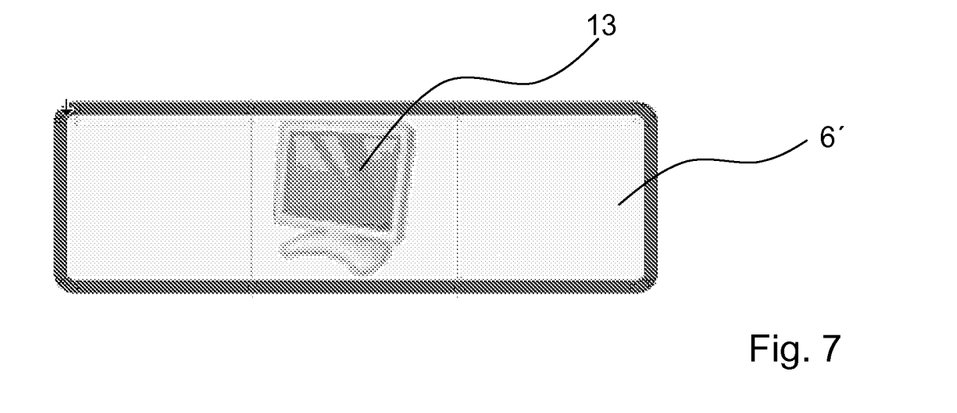
FIG. 7 illustrates another embodiment of the invention, shown in an environment comprising a single large display unit.

FIG. 7 illustrates the invention implemented in a large display unit 13 setup. The arrangement thumbnail 6' may then look as illustrated in FIG. 7. In this scenario, the user does not need to choose a display unit. The interaction begins in the same way as described in the first embodiment, and then the user only needs to choose the placement on the display unit 13 by dragging a representation of the information to the desired spot. The number of different choices of placements can be very flexible and different from case to case.

An advantageous feature is that the user gets a visible feedback on where the information will be placed if he drops it. The interaction ends in the same way as was described in the above embodiment, i.e. when the user drops the information on the desired place.

It is noted that the invention is advantageous in many applications, for example the mentioned controlling of automated systems, or other technical systems and in particular supervision and/or control of power transmission and/or distribution networks.

Figure 8:
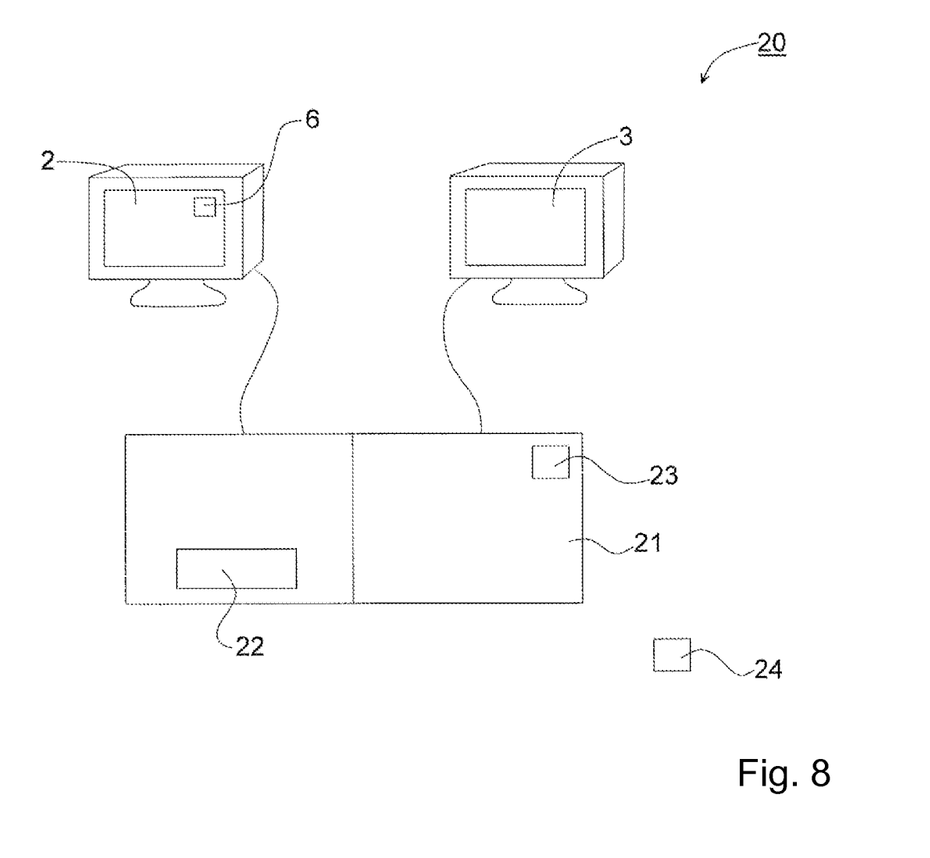
FIG. 8 illustrates a supervisory control system in accordance with the invention.

FIG. 8 illustrates schematically a supervisory control system 20 for controlling for example a power transmission network. The control system 20 comprises one or more display units 2, 3, 4, 5, which constitute the display working environment 1, as shown in FIG. 1. In the FIG. 8 only two display units 2, 3 are illustrated, but it is realized that there can be any number of display units.

The display units 2, 3 are connected to a computer 21 or other processing means, i.e. are in data communication therewith. From the computer 21, information to be displayed on the display units 2, 3 is retrieved. The information is related mainly to the application at hand, comprising for example information derived from and used within a substation of the power transmission network. Examples of such information comprise measurement values, status updates, alarm lists, etc.

The above-described arrangement thumbnail 6 will appear as soon as the user wishes to move some information object 11 from one display unit to another or within a single large display unit, or as soon as the operator wishes to show some new information. The arrangement thumbnail 6, comprising the graphical representation 7, 8 (see FIG. 2) of the display working environment 1, is thus provided on one of the display units 2, 3, preferably the one within which the operator is presently working.

The computer 21 comprises means 22 for handling the display information, i.e. what information should be displayed on which display unit 2, 3. Such means may for example be implemented in software and stored on any suitable location, for example a graphics card. When the user wishes to move some information object, the means 22 for handling the display information is updated.

Figure 9:
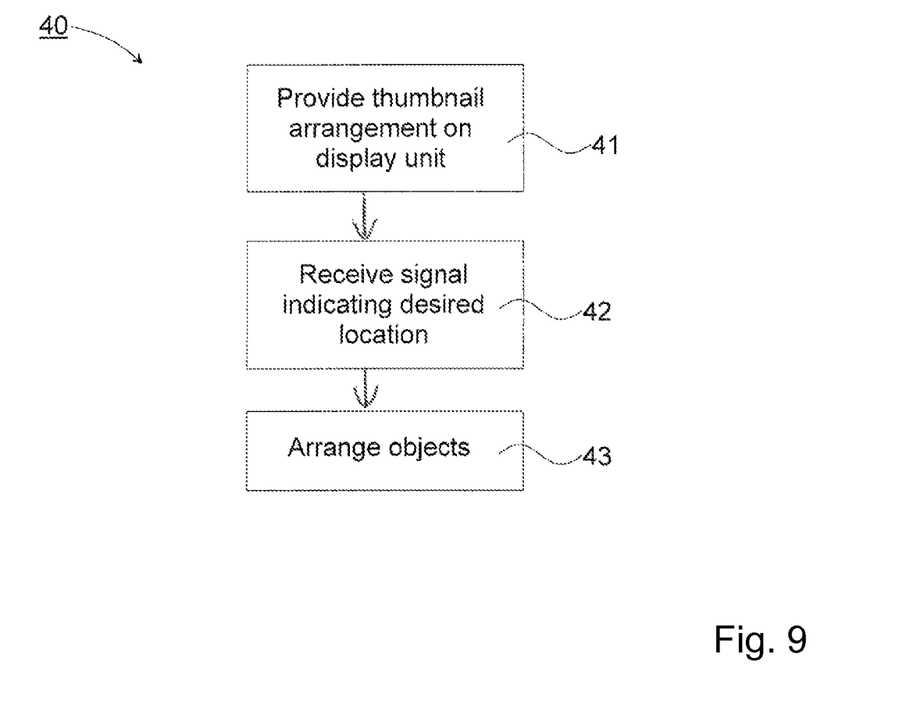
FIG. 9 illustrates a flow chart over steps of a method in accordance with the present invention.

With reference to FIG. 9, the present invention provides a method 40 for arranging objects 11 used in a supervisory control system comprising one or more display units 2, 3, 4, 5. The display units 2, 3, 4, 5 constitute a display working environment 1.

The method 40 comprises the first step of providing 41, on one of the display units 2, 3, 4, 5, an arrangement thumbnail 6, 6'. The arrangement thumbnail 6, 6' comprises a graphical representation 7, 8, 9, 10; 13 of the display working environment 1. The arrangement thumbnail 6 may be created by storing, within the supervisory control system 20, information on the working environment 1 and relating this information to a thumbnail picture of the working environment 1. If the working environment 1 changes, for example by adding or removing a display unit, then the information should be updated accordingly.

The method 40 comprises the second step of receiving 42 a user input signal related to a desired location of the objects 11 on one of the display units 2, 3, 4, 5; 13. The user input signal comprises operations performed within the arrangement thumbnail 6; 6'. The user input signal may comprise a signal that is input by a user by means of any suitable input device, for example a computer mouse, a keyboard or a touch screen.

The method 40 comprises the third step of arranging 43, in response to receiving the user input signal, the objects 11. Based on the user input signal, the objects are thus moved, or shown in case the operator selects new information that is not yet visible, and placed at a particular location.

The operations performed within the arrangement thumbnail 6; 6' may for example comprise selecting a particular display unit 2, 3, 4, 5 and/or a specific part of the display unit 2, 3, 4, 5.

In an embodiment of the invention, the step of providing, on one of the display units 2, 3, 4, 5, an arrangement thumbnail 6; 6' comprises showing the arrangement thumbnail 6; 6' upon receiving an information arranging signal.

The information arranging signal may be received when a user selects the object 11 from a list, from a map or the like, or when a user performs a drag operation of the object 11. The objects 11 are then moved from one of the display units 2, 3, 4, 5; 13 to another, and/or from one location of one of the display units 2, 3, 4, 5; 13 to another location thereon. If the object 11 is a new piece of information it is shown on the desired location.

In another embodiment of the invention, more than one operation may be required for the information arranging signal to be received. For example, the information arranging signal may be received and the arrangement thumbnail 6; 6' thus be shown when a user has done two operations, for example a first operation of clicking on a mouse button in order to display a context menu and then a second operation of selecting from the context menu.

The method 40 may comprise yet additional steps, for example the further step of providing a feedback signal visualizing where on the display units 2, 3, 4, 5; 13 the objects 11 will be placed, the feedback signal being based on the user input signal. Further the step of outputting the feedback signal on one of the display units 2, 3, 4, 5; 13 should then be included. The feedback signal may for example be visualized by using a different shade for the suggested placement compared to the surrounding environment, as described earlier.

The invention may be implemented in different technical systems. The invention may be implemented in the supervisory control system 20 supervising such technical systems by adding suitable computer program product 23, for example stored on a computer readable medium such as a compact disc or floppy diskette, indicated schematically in FIG. 8 at 24. The method of the present invention can thus be implemented as a computer program product 23, which is loadable into the computer 21 of the supervisory control system 20. The computer program product 23 comprises software code portions for performing the method when the product is run on the computer 21.

The invention thus also encompasses the computer program product 23. For example, the computer 21 comprises means for receiving the computer readable medium 24 and means for executing the computer program product 23 for carrying out the steps of: providing, on one of the display units 2, 3, 4, 5, an arrangement thumbnail 6; 6' comprising a graphical representation 7, 8, 9, 10; 13 of the display working environment 1; receiving a user input signal related to a desired location of the objects 11 on one of the display units 2, 3, 4, 5; 13, the user input signal comprising operations performed within the arrangement thumbnail 6, 6'; and arranging, in response to receiving the user input signal, the objects 11. Further related steps may also be implemented by means of the computer program product 23.

In summary, by means of the invention, an ergonomic way of arranging or managing objects is provided. The need for the user to make large physical movements for moving an object from one physical display unit to another is eliminated by means of the provided arrangement thumbnail.

The invention claimed is:

1. A supervisory control system controlling a power transmission and/or distribution system, said supervisory control system comprising:
   one or more display units constituting a display working environment and comprising means that visualize information objects related to the controlling of said power transmission and/or distribution system,
   an arrangement thumbnail comprising a graphical representation of said display working environment comprising thumbnail images of said one or more display units, and
   means for arranging said information objects by operations performed within said arrangement thumbnail,
   wherein said means for arranging is configured to
      receive a user input signal related to a desired location of at least one of said objects in a specific one of a plurality of parts of one of said display units, wherein said arrangement thumbnail is initially hidden and pops up on the one of said display units as soon as the at least one of said objects starts to be dragged and keeps displayed on the one of said display units during dragging of the at least one of said objects, and the thumbnail image of the one of said display units on which said arrangement thumbnail is provided is present in the arrangement thumbnail, said user input signal comprising operations performed within said arrangement thumbnail through moving of the at least one of said objects over the thumbnail image of said one display unit within the arrangement thumbnail,
      provide a feedback signal visualizing where on said one display unit the at least one of said objects will be placed, and output said feedback signal on said one display unit during dragging of the at least one of said objects over the thumbnail image of said one display unit but before the at least one of said objects is dropped to said one display unit, and
      arrange, in response to receiving said user input signal, the at least one of said objects in the specific one of the plurality of parts of said one display unit dependent on whereto a specific one of a plurality of parts on the thumbnail image of said one display unit in the arrangement thumbnail said information objects are dropped, wherein each of the plurality of parts of said one display unit corresponds to one of the plurality of parts on the thumbnail image of said one display unit.

2. The supervisory control system as claimed in claim 1, wherein the thumbnail arrangement is provided on the display unit from which said information objects are to be moved.

3. The supervisory control system as claimed in claim 1, wherein the thumbnail arrangement is provided on the display unit from which said information objects are to be moved.

4. The supervisory control system as claimed in claim 1, wherein the feedback signal on which the at least one of said objects is placed is outputted in form of using a different shade compared to a surrounding environment on said one display unit.

5. A method for arranging objects used in a supervisory control system that controls a power transmission and/or distribution system, said control system comprising one or more display units constituting a display working environment, the method wherein the steps of:
prov256ing an arrangement thumbnail comprising a graphical representation of said display working environment comprising thumbnail images of said one or more display units,
visualizing information objects related to the controlling of said power transmission and/or distribution system,
receiving a user input signal related to a desired location of at least one of said objects in a specific one of a plurality of parts of one of said display units, wherein said arrangement thumbnail is initially hidden and pops up on the one of said display units as soon as the at least one of said objects starts to be dragged and keeps displayed on the one of said display units during dragging of the at least one of said objects, and the thumbnail image of the one of said display units on which said arrangement thumbnail is provided is present in the arrangement thumbnail, said user input signal comprising operations performed within said arrangement thumbnail through moving of the at least one of said objects over the thumbnail image of said one display unit within the arrangement thumbnail,
providing a feedback signal visualizing where on said one display unit the at least one of said objects will be placed, and outputting said feedback signal on said one display unit during dragging of the at least one of said objects over the thumbnail image of said one display unit but before the at least one of said objects is dropped to said one display unit, and
arranging, in response to receiving said user input signal, the at least one of said objects in the specific one of the plurality of parts of said one display unit dependent on whereto a specific one of a plurality of parts on the thumbnail image of said one display unit in the arrangement thumbnail said information objects are moved and dropped, wherein each of the plurality of parts of said one display unit corresponds to one of the plurality of parts on the thumbnail image of said one display unit.

6. The method as claimed in claim 5, wherein said step of providing, on one of said display units, an arrangement thumbnail comprises showing said arrangement thumbnail upon receiving an information arranging signal.

7. The method as claimed in claim 6, wherein said information arranging signal is received when a user selects said object from a list, from a map, or when a user performs a drag operation of said object, whereby said objects are moved from one of said display units to said specific one of a plurality of parts of another display unit or from one location of said one display unit to another location thereon.

8. The method as claimed in claim 7, wherein said objects comprise information objects such as text, pictures, and/or software applications.

9. The method as claimed in claim 7, wherein said step of arranging comprises updating means for handling said objects.

10. The method as claimed in claim 6, wherein said objects comprise information objects such as text, pictures, and/or software applications.

11. The method as claimed in claim 6, wherein said step of arranging comprises updating means for handling said objects.

12. The method as claimed in claim 5, wherein said objects comprise information objects such as text, pictures, and/or software applications.

13. The method as claimed in claim 5, wherein said step of arranging comprises updating means for handling said objects.

14. The method according to claim 5, wherein the thumbnail arrangement is provided on the display unit from which said information objects are to be moved.

15. The method as claimed in claim 5, wherein said objects comprise information objects such as text, pictures, and/or software applications.

16. The method as claimed in claim 5, wherein the feedback signal on which the at least one of said objects is placed is outputted in form of using a different shade compared to a surrounding environment on said one display unit.

17. A computer program product embodied on an internal and non-transitory memory device of a computer of a supervisory control system, comprising software code portions for carrying out the method as claimed in claim 5 when said product is run on said computer.

18. A computer program product embodied on a non-transitory computer readable storage medium, comprising computer readable program code means for causing a computer of a supervisory control system, to carry out the method as claimed in claim 5.

* * * * *

UNITED STATES PATENT AND TRADEMARK OFFICE
CERTIFICATE OF CORRECTION

PATENT NO. : 10,860,162 B2
APPLICATION NO. : 13/264684
DATED : December 8, 2020
INVENTOR(S) : Christine Mikkelsen It is certified that error appears in the above-identified patent and that said Letters Patent is hereby corrected as shown below:

In Column 10, Line 26, Claim 12, delete "The method as claimed in 5" and insert --The method as claimed in claim 5--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*